(12) United States Patent
Kato

(10) Patent No.: US 10,552,724 B2
(45) Date of Patent: Feb. 4, 2020

(54) RFID TAG AND ARTICLE HAVING RFID TAG ATTACHED THERETO

(71) Applicant: Murata Manufacturing Co., Ltd., Nagaokakyo-shi, Kyoto-fu (JP)

(72) Inventor: Noboru Kato, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 0 days.

(21) Appl. No.: 16/412,769

(22) Filed: May 15, 2019

(65) Prior Publication Data

US 2019/0266467 A1  Aug. 29, 2019

Related U.S. Application Data

(63) Continuation of application No. PCT/JP2018/040349, filed on Oct. 30, 2018.

(30) Foreign Application Priority Data

Dec. 15, 2017 (JP) ................ 2017-241014

(51) Int. Cl.
*G06K 19/077* (2006.01)
*G06K 19/07* (2006.01)
(Continued)

(52) U.S. Cl.
CPC ..... *G06K 19/07779* (2013.01); *G06K 19/077* (2013.01); *G06K 19/0723* (2013.01);
(Continued)

(58) Field of Classification Search
CPC ........ G06K 19/00; G06K 19/04; G06K 19/06; G06K 19/067; G06K 19/07
(Continued)

(56) References Cited

U.S. PATENT DOCUMENTS

2012/0006904 A1  1/2012  Kato et al.
2016/0321535 A1*  11/2016  Ban .................. G06K 19/07788

FOREIGN PATENT DOCUMENTS

JP  2009049763 A  3/2009
JP  2014082546 A  5/2014
(Continued)

OTHER PUBLICATIONS

International Search Report issued for PCT/JP2018/040349, dated Dec. 25, 2018 (in Japanese).
(Continued)

*Primary Examiner* — Edwyn Labaze
(74) *Attorney, Agent, or Firm* — Arent Fox LLP

(57) ABSTRACT

An RFID tag that includes a radio IC chip, an antenna pattern, a matching circuit, a capacitive coupling member connected to the antenna pattern and capacitively coupled to a metal surface, and an insulating substrate. The antenna pattern includes a first antenna pattern connected to the radio IC chip with the matching circuit interposed therebetween and a second antenna pattern having one end connected to the radio IC chip with the matching circuit interposed therebetween and the other end connected to the capacitive coupling part. Moreover, the RFID tag includes a capacitive member between the first antenna pattern and the capacitive coupling part, and the antenna pattern, the capacitive coupling part, and the capacitive part are connected in a loop.

20 Claims, 15 Drawing Sheets

(51) Int. Cl.
    *H01Q 13/08*    (2006.01)
    *H01Q 1/38*     (2006.01)
(52) U.S. Cl.
    CPC ... *G06K 19/0772* (2013.01); *G06K 19/07745* (2013.01); *H01Q 1/38* (2013.01); *H01Q 13/08* (2013.01)
(58) Field of Classification Search
    USPC .............................. 235/492, 487, 387, 375
    See application file for complete search history.

(56) References Cited

FOREIGN PATENT DOCUMENTS

| | | |
|---|---|---|
| JP | 5510450 B2 | 6/2014 |
| JP | 2015225579 A | 12/2015 |

OTHER PUBLICATIONS

Written Opinion of the International Searching Authority issued for PCT/JP2018/040349, dated Dec. 25, 2018.

\* cited by examiner

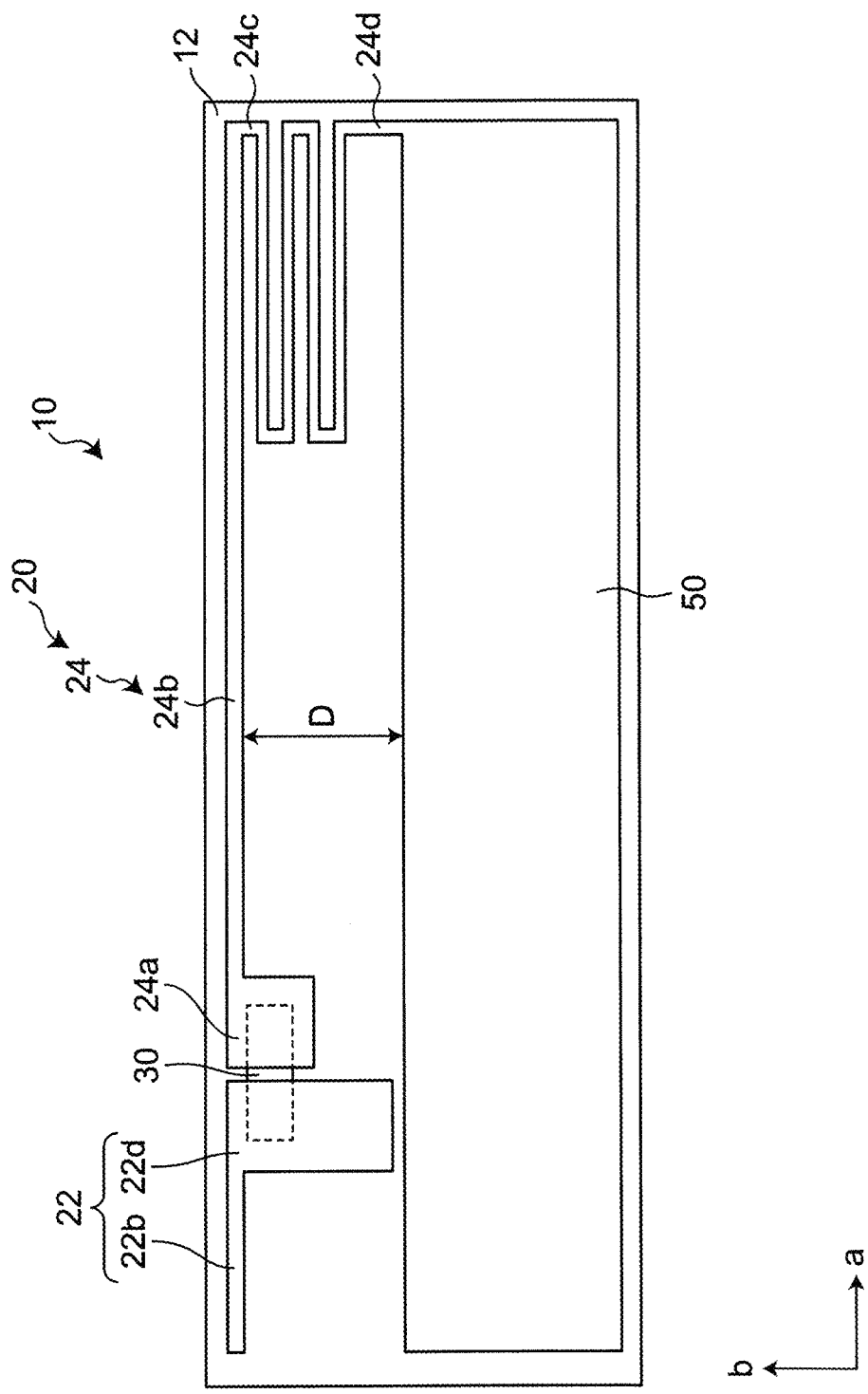

(PRIOR ART)

(PRIOR ART)

RFID TAG AND ARTICLE HAVING RFID TAG ATTACHED THERETO

CROSS REFERENCE TO RELATED APPLICATIONS

The present application is a continuation of PCT/JP2018/040349 filed Oct. 30, 2018, which claims priority to Japanese Patent Application No. 2017-241014, filed Dec. 15, 2017, the entire contents of each of which are incorporated herein by reference.

TECHNICAL FIELD

The present invention relates to a radio frequency identification (RFID) for use in contactless article information management and the like using near field communication, and an article to which the RFID tag is attached.

BACKGROUND

Conventionally, in a system for managing article information, article information is managed using contactless communication using an electromagnetic field between an RFID tag attached to an article and a reader that reads tag information of the RFID tag.

Patent Document 1 (identified below) describes a configuration in which a metal surface of a metal article is used as a radiator of radio waves from an RFID tag in a case where the RFID tag is attached to the metal article, for example.

Referring to FIGS. 16A and 16B, Patent Document 1 describes a magnetic field antenna capacitively coupled to a radiation plate 115 in which a thin metal plate is attached to a base 110. A coupling electrode 135 electrically forms an annular electrode through capacitive coupling between opposing ends 136c, 136d to function as a magnetic field antenna. The coupling electrode 135 includes a pair of coupling parts 136a, 136b coupled to a radio IC chip 105. Patent Document 1: JP 5510450 B2.

FIG. 17 is an equivalent circuit diagram of a radio IC device shown in FIGS. 16A and 16B. The coupling electrode 135 has an inductance component La, internal capacitance Ca of the radio IC chip 105, capacitance Cb between the opposing ends 136c, 136d, and capacitance Cc between the coupling electrode 135 and the radiation plate 115. An antenna shown in FIGS. 15A and 15B is described as a magnetic field antenna, the resonant circuit constitutes a resonator whose impedance becomes infinite (an actual measured value is in a range of several $K\Omega$ to several $M\Omega$ depending on the Q value of the inductance element) when impedance measurement is performed across the radio IC chip 105 with the internal capacitance Ca left as stray capacitance.

The coupling electrode 135 having such a circuit configuration functions as a magnetic field antenna and allows the radiation plate 115 to generate radio waves by radiating a magnetic field. As described above, the radio IC device described in Patent Document 1 communicates by causing a metal surface thereof capacitively and magnetically coupled to the metal surface of the article to generate an electric field and radiate radio waves into the air. However, no electric field is generated from the radio IC device itself, a communication distance of the radio IC device itself is as short as several mm to several cm. This makes the communication distance small even when a radio communication device is attached to metal.

SUMMARY OF THE INVENTION

Therefore, an object of the present invention is to solve the above problem, and to provide an RFID tag attached to a metal surface of an article and having an increased communication distance.

Thus, according to an exemplary aspect of the present invention, an RFID tag attached to a metal surface of an article includes a radio IC chip, an antenna pattern electrically connected to the radio IC chip, a matching circuit configured to match the radio IC chip to the antenna pattern, a capacitive coupling part connected to the antenna pattern and capacitively coupled to the metal surface, and an insulating substrate on which the antenna pattern and the capacitive coupling part are formed. The antenna pattern includes a first antenna pattern connected to the radio IC chip with the matching circuit interposed between the first antenna pattern and the radio IC chip, and a second antenna pattern having one end connected to the radio IC chip with the matching circuit interposed between the one end and the radio IC chip and the other end connected to the capacitive coupling part. Moreover, the RFID tag includes a capacitive part having capacitance between the first antenna pattern and the capacitive coupling part, and the antenna pattern, the capacitive coupling part, and the capacitive part are connected in a loop.

Further, according to another exemplary aspect of the present invention, an article includes a metal surface, and an RFID tag attached to the metal surface. The RFID tag includes a radio IC chip, an antenna pattern electrically connected to the radio IC chip, a matching circuit configured to match the radio IC chip to the antenna pattern, a capacitive coupling part connected to the antenna pattern and capacitively coupled to the metal surface, and an insulating substrate on which the antenna pattern and the capacitive coupling part are formed. The antenna pattern includes a first antenna pattern connected to the radio IC chip with the matching circuit interposed between the first antenna pattern and the radio IC chip, and a second antenna pattern having one end connected to the radio IC chip with the matching circuit interposed between the one end and the radio IC chip and the other end connected to the capacitive coupling part. Moreover, the RFID tag includes a capacitive part having capacitance between the first antenna pattern and the capacitive coupling part, and the antenna pattern, the capacitive coupling part, and the capacitive part are connected in a loop.

With the RFID tag according to the present invention, the communication distance from the RFID tag attached to the metal surface can be increased as compared with convention communication designs.

BRIEF DESCRIPTION OF THE DRAWINGS

FIG. 15 is a schematic plan view of an RFID tag of a modification.

DETAILED DESCRIPTION OF EXEMPLARY EMBODIMENTS

Figure 1:
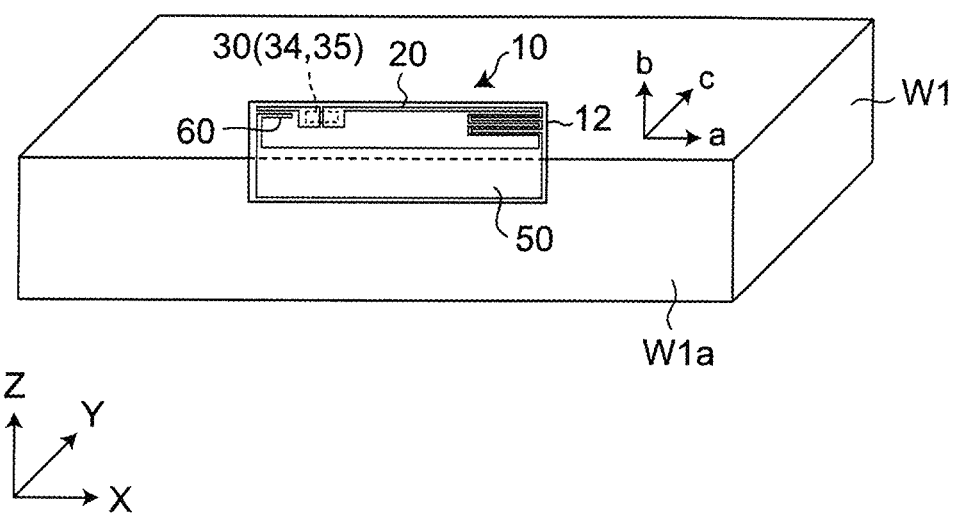
FIG. 1 is an explanatory diagram showing a state in which an RFID tag of a first embodiment is attached to an article.

An RFID tag according to an exemplary aspect of the present invention is attached to a metal surface of an article and includes a radio IC chip, an antenna pattern electrically connected to the radio IC chip, a matching circuit configured to match the radio IC chip to the antenna pattern, a capacitive coupling part connected to the antenna pattern and capacitively coupled to the metal surface, and an insulating substrate on which the antenna pattern and the capacitive coupling part are formed. The antenna pattern includes a first antenna pattern connected to the radio IC chip with the matching circuit interposed between the first antenna pattern and the radio IC chip, and a second antenna pattern having one end connected to the radio IC chip with the matching circuit interposed between the one end and the radio IC chip and the other end connected to the capacitive coupling part. Moreover, the RFID tag includes a capacitive part having capacitance between the first antenna pattern and the capacitive coupling part, and the antenna pattern, the capacitive coupling part, and the capacitive part are connected in a loop.

According to this exemplary aspect, radio waves are generated not only from the metal surface but also from the antenna, making it possible to provide an RFID tag having an increased communication distance and attachable to a metal surface of an article.

In an exemplary aspect, the capacitive coupling part may be disposed along an edge side of the insulating substrate, and the radio IC chip and the matching circuit may be disposed opposite to the capacitive coupling part.

In an exemplary aspect, the capacitive part may be disposed opposite to the capacitive coupling part.

In an exemplary aspect, the second antenna pattern may include a meander pattern formed by a plurality of long segments parallel to one edge side of the insulating substrate and a plurality of short segments parallel to the other edge side of the insulating substrate.

Moreover, in an exemplary aspect, a connection portion of the second antenna pattern to the capacitive coupling part may be greater in pattern width than the other portions of the second antenna pattern.

In addition, a bend line may be formed in the insulating substrate on which the capacitive coupling part is formed, and the insulating substrate may include, with the bend line as a boundary, a first region in which a half or more in area of the capacitive coupling part is formed, and a second region in which the radio IC chip is disposed.

In another exemplary aspect, the insulating substrate may include a third region that is identical in area to the second region and continuously extends from the second region, and a fourth region that continuously extends from the third region, and different bend lines are individually formed along a boundary between the second region and the third region and a boundary between the third region and the fourth region in the insulating substrate.

Moreover, the RFID tag may further include a double-sided adhesive tape attached to a side of the insulating substrate on which the antenna pattern and the radio IC chip mounted on the antenna pattern are disposed. In this aspect, the insulating substrate may be bent along the bend line serving as the boundary between the second region and the third region to cause the second region and the third region to be attached to each other, and the first region and the fourth region may be attached to a base paper interposed between the first region and the fourth region.

In an exemplary aspect, the insulating substrate may be bent along the bend line serving as the boundary between the first region and the second region to make the second region perpendicular or inclined to the first region.

In an exemplary aspect, the insulating substrate may be bent along the bend line serving as the boundary between the third region and the fourth region to make the third region perpendicular or inclined to the fourth region.

An article according to an exemplary aspect of the present invention includes a metal surface, and an RFID tag attached to the metal surface. The RFID tag includes a radio IC chip, an antenna pattern electrically connected to the radio IC chip, a matching circuit configured to match the radio IC chip to the antenna pattern, a capacitive coupling part connected to the antenna pattern and capacitively coupled to the metal surface, and an insulating substrate on which the antenna pattern and the capacitive coupling part are formed. Moreover, the antenna pattern includes a first antenna pattern connected to the radio IC chip with the matching circuit interposed between the first antenna pattern and the radio IC chip, and a second antenna pattern having one end connected to the radio IC chip with the matching circuit interposed between the one end and the radio IC chip and the other end connected to the capacitive coupling part. In this aspect, the RFID tag includes a capacitive part having capacitance between the first antenna pattern and the capacitive coupling part, and the antenna pattern, the capacitive coupling part, and the capacitive part are connected in a loop.

According to this aspect, radio waves are generated not only from the metal surface but also from the antenna, making it possible to provide an article including a metal surface to which an RFID tag having an increased communication distance is attached.

Hereinafter, the RFID tag according to the present invention will be described with reference to the drawings. It is noted that, in the drawings, members having substantially the same function and configuration are denoted by the same reference numeral, and description of such members may be omitted herein. Further, for ease of understanding, each of the drawings schematically shows a main part of each component.

It is further noted that any of the exemplary embodiments described below corresponds to one specific example of the present invention, and the present invention is not limited to the configuration. Further, numerical values, shapes, configurations, steps, an order of steps, and the like specifically shown in the following embodiments are merely examples and do not limit the present invention. Among the components in the following embodiments, components that are not given in the independent claims that define the highest level concepts are described as optional components. Further, in all the embodiments, respective configurations in modifications are the same, and the configurations described in the modifications may be combined.

First Embodiment

Figure 2:
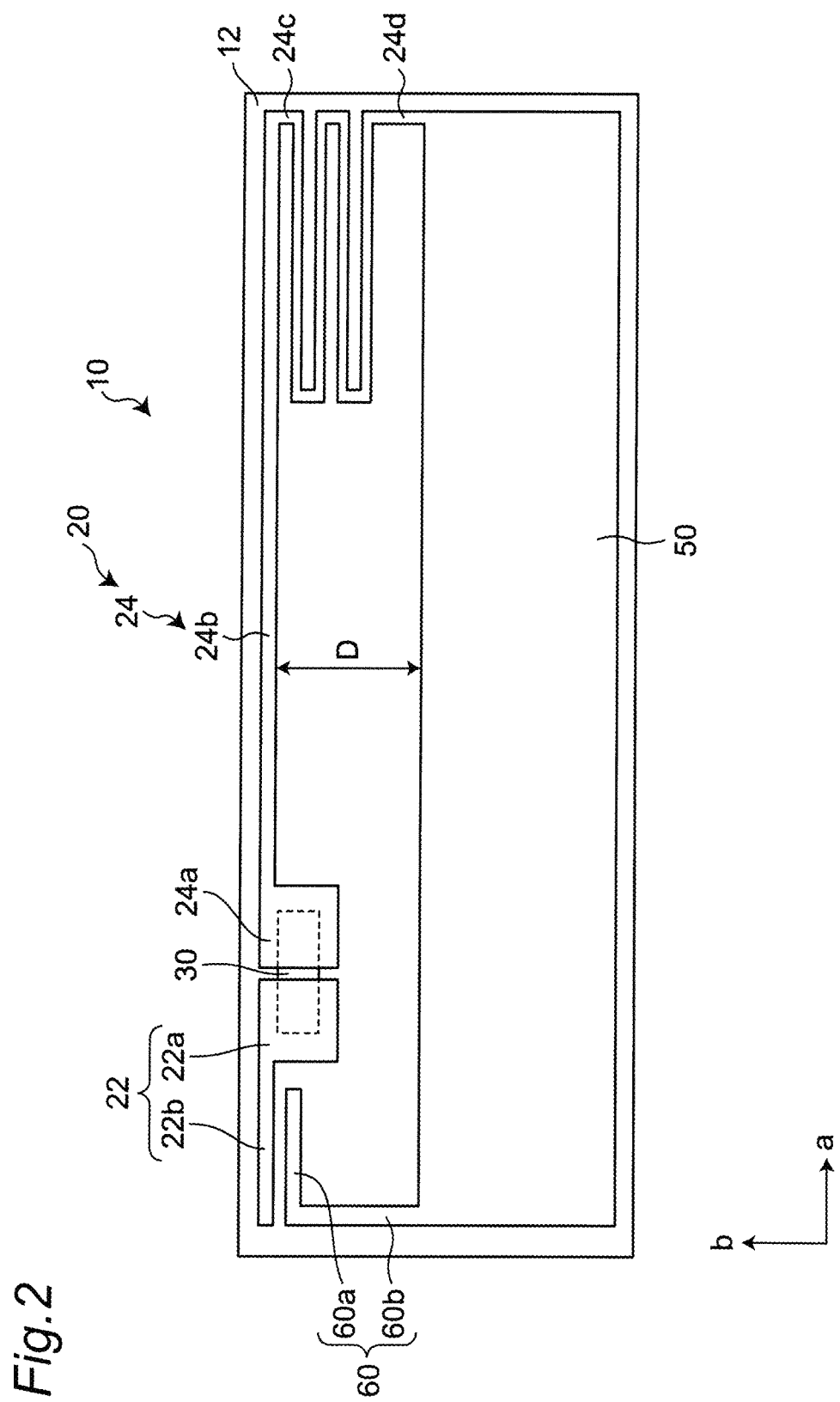
FIG. 2 is a schematic plan view of the RFID tag of the first embodiment.

Description will be given below of a radio-frequency identification (RFID) tag and an article to which the RFID tag is attached, according to the first exemplary embodiment of the present invention. FIG. 1 is a perspective view of the article to which the RFID tag of the first embodiment is attached. FIG. 2 is a front view of the RFID tag of the first embodiment. In the drawings, an X-Y-Z coordinate system and an a-b-c coordinate system facilitate the understanding of the invention, but do not limit the invention. An X-axis direction indicates a longitudinal direction of an article W1, a Y-axis direction indicates a width direction, and a Z-axis direction indicates a thickness direction. The X-axis, Y-axis, Z-axis directions are orthogonal to one another. Further, an a-axis direction indicates a longitudinal direction of the RFID tag, a b-axis direction indicates a height direction, and a c-axis direction indicates a thickness direction. The a-axis, b-axis, c-axis directions are orthogonal to one another. FIG. 1 shows an RFID tag 10 attached to a metal surface W1a of the article W1 such as a metal case.

As shown, the RFID tag 10 includes an insulating sheet 12 configured as a tag body, an antenna pattern 20 formed on a back side (rear side in the c direction) of the insulating sheet 12, a radio-frequency integrated circuit (RFIC) module 30 connected to the antenna pattern 20, a capacitive coupling part 50 (i.e., a capacitive coupling member) that causes the antenna pattern 20 and the metal surface W1a of the article W1 to capacitively coupled to each other, and a capacitive pattern 60 that generates capacitance between the capacitive coupling part 50 and a portion of the antenna pattern 20 located closer to a distal end than a connection between the antenna pattern 20 and the RFIC module 30. The antenna pattern 20, the capacitive coupling part 50, and the capacitive pattern 60 are conductive patterns. Such a conductive pattern is, for example, metal wiring formed of copper, aluminum, or the like.

In the RFID tag 10, the antenna pattern 20, the RFIC module 30, the capacitive coupling part 50, and the capacitive pattern 60 are each disposed on the back side of the insulating sheet 12. Further, a double-sided adhesive tape is attached to the back side of the insulating sheet 12 on which the above components are disposed. The RFID tag 10 is attached to the metal surface W1a with the double-sided adhesive tape interposed therebetween. At this time, the capacitive coupling part 50 faces the metal surface W1a with the double-sided adhesive tape interposed therebetween. Further, the RFID tag 10 is attached such that an upper half of the RFID tag 10 protrudes upward from the metal surface W1a, and accordingly the RFIC module 30 is located away from the metal surface W1a. As described above, as long as a side of the RFID tag 10 where the RFIC module 30 is disposed protrudes from the metal surface W1a, the RFID tag 10 may be attached along a vertical direction of the metal surface W1a.

An area of the capacitive coupling part 50 is large enough to obtain capacitance C2 (see FIG. 4) with the metal surface W1a. As a result, a high frequency current flows in the metal surface W1a, and accordingly radio waves are radiated from the metal surface W1a, so that the metal surface W1a functions as a radiation element to increase a communication distance of the RFID tag 10.

Referring to FIG. 2, the insulating sheet 12 is an insulating sheet made of resin or paper, such as a polyethylene terephthalate (PET) sheet. Examples of the insulating sheet 12 may include, in addition to the PET sheet, a polyethylene naphthalene (PEN) sheet or a polyimide sheet. The insulating sheet 12 has a rectangular or substantially rectangular shape, but may have an arc-shaped side. The capacitive coupling part 50 is disposed along an edge side that is one of long segments (i.e., a first long segment) of the insulating sheet 12, and a first antenna pattern 22, a part of a second antenna pattern 24, and the RFIC module 30 are disposed along an edge side that is the other long segment (i.e., a second long segment).

According to the exemplary aspect, the antenna pattern 20 is a field emission antenna. The antenna pattern 20 is a so-called inverted L antenna having an inverted L shape. The antenna pattern 20 includes the first antenna pattern 22 of which one end is an open end and the other end is connected to the RFIC module 30, and the second antenna pattern 24 of which one end is connected to the RFIC module 30 and the other end is connected to the capacitive coupling part 50.

As further shown, the first antenna pattern 22 includes a land 22a connected to the RFIC module 30, and a strip 22b extending from the land 22a. The land 22a and the strip 22b are disposed along the edge side of the insulating sheet 12.

The second antenna pattern 24 includes a land 24a connected to the RFIC module 30, a strip 24b extending from the land 24a, a meander pattern 24c formed by a conductive pattern that extends from the strip 24b and is repeatedly bent, and a connection 24d that extends from the meander pattern 24c and is connected to the capacitive coupling part 50.

According to the exemplary aspect, the land 24a and the strip 24b are disposed along the edge side of the insulating sheet 12. A distance D between the strip 24b and the capacitive coupling part 50 is, for example, 3 mm or more. Further, as shown in FIG. 2, the RFID tag 10 has a tag shape that is horizontally long in the X direction of FIG. 1, and the capacitive coupling part 50 is horizontally long with respect to the metal surface W1a. A high frequency current flows in the capacitive coupling part 50 between the strip 24b and the connection 60b. Therefore, as the strip 24b and the connection 60b are distanced from each other, a phase difference of the high frequency current occurs, thereby facilitating excitation of a high frequency current in the metal surface W1a through the capacitive coupling. As a result, the coupling with the metal surface W1a becomes stronger, and accordingly energy is easily transferred to the metal surface W1a, which in turn increase the communication distance of the RFID tag 10.

Figure 3:
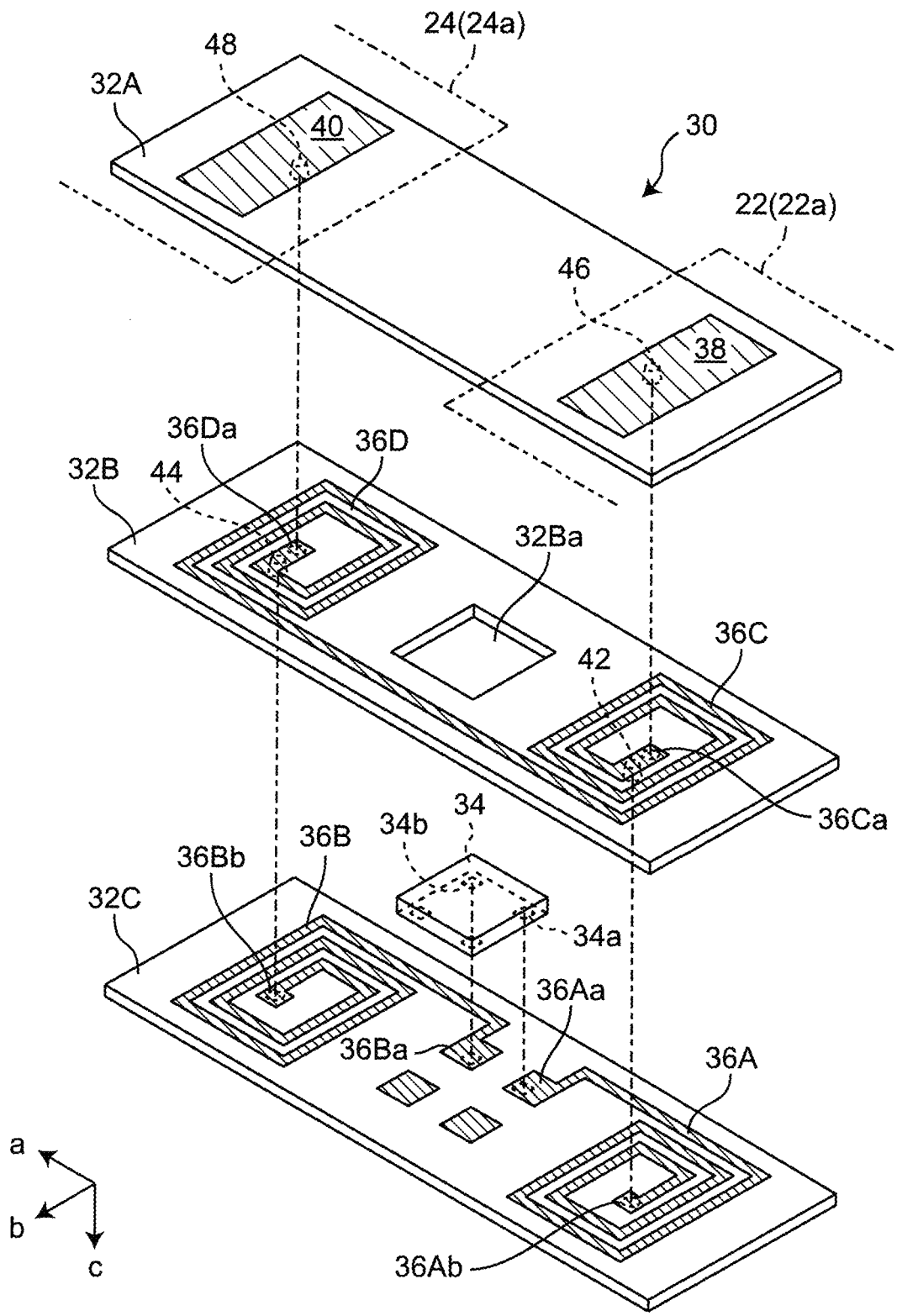
FIG. 3 is an exploded perspective view of an RFIC module.
Figure 4:
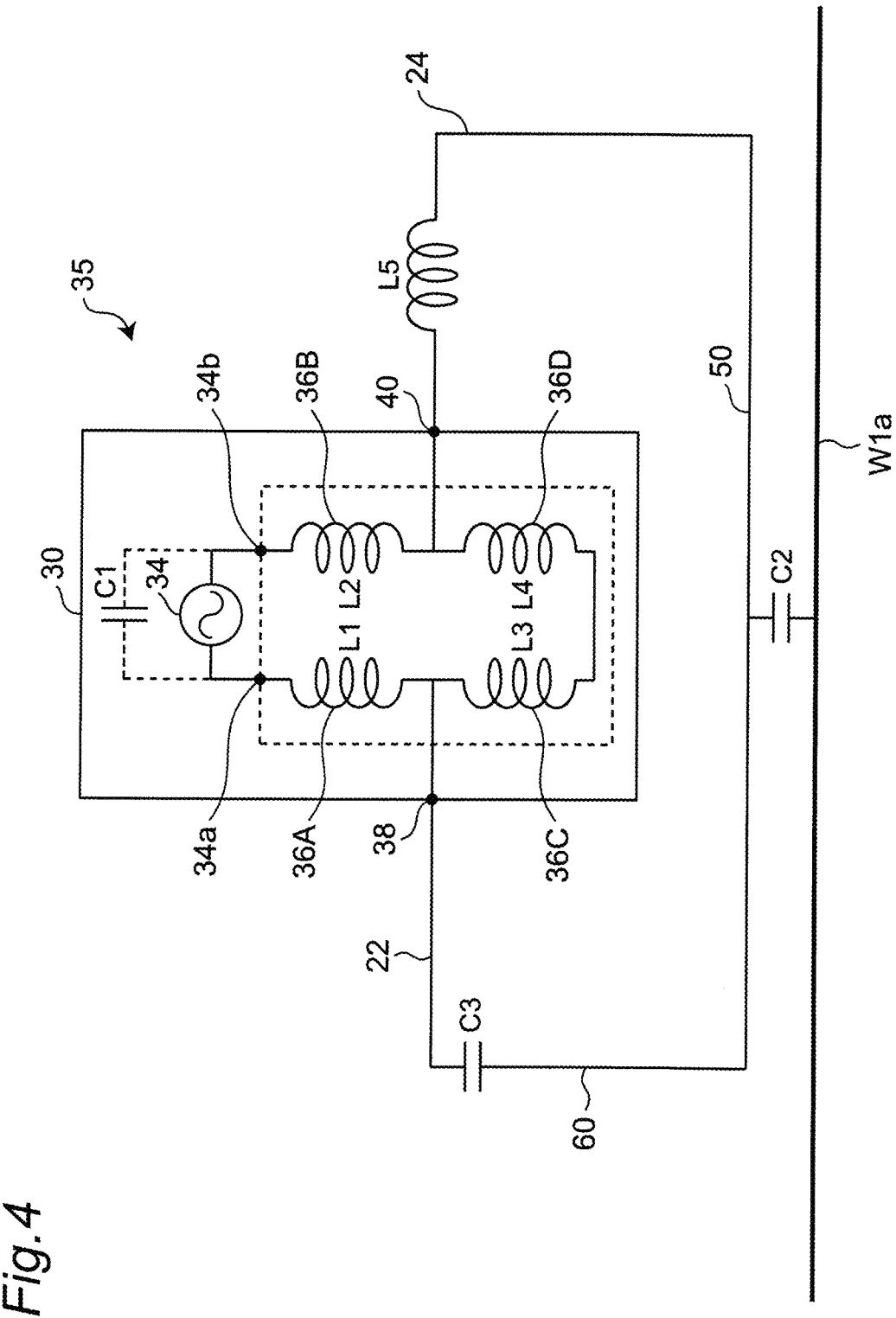
FIG. 4 is an equivalent circuit diagram of the RFID tag attached to a metal surface of the article.

FIG. 3 is an exploded perspective view of the RFIC module 30. FIG. 4 is an equivalent circuit diagram of the RFID tag 10 attached to the metal surface W1a of the article W1.

As shown in FIG. 3, in the first embodiment, the RFIC module 30 is formed by a multilayer substrate of three layers. Specifically, the RFIC module 30 is formed by insulating sheets 32A, 32B, and 32C that are stacked on one another, the insulating sheets 32A, 32B, and 32C being made of a resin material such as polyimide or a liquid crystal polymer and accordingly having flexibility. It is noted that FIG. 3 shows a state in which the RFIC module 30 shown in FIG. 2 is turned over and disassembled.

The RFIC module 30 includes an RFIC chip 34, a plurality of inductance elements 36A, 36B, 36C, and 36D, and external connection terminals 38, 40. In the first embodiment, the inductance elements 36A to 36D and the external connection terminals 38, 40 are formed on the insulating sheets 32A to 32C, and are each formed by a conductive pattern made of a conductive material such as copper.

The RFIC chip 34 is mounted at a center in the longitudinal direction (a-axis direction) on the insulating sheet 32C. The RFIC chip 34 has a structure in which various elements are incorporated in a semiconductor substrate made of a semiconductor such as silicon. The RFIC chip 34 further includes a first input and output terminal 34a and a second input and output terminal 34b. Furthermore, as shown in FIG. 4, the RFIC chip 34 has internal capacitance (capacitance) C1 that is self-capacitance of the RFIC chip 34.

As shown in FIG. 3, the inductance element (first inductance element) 36A is formed by a conductive pattern formed in a spiral coil shape on one side in the longitudinal direction (a-axis direction) of the insulating sheet 32C. Further, as shown in FIG. 4, the inductance element 36A has an inductance L1. A land 36Aa to be connected to the first input and output terminal 34a of the RFIC chip 34 is provided at one end (end outside the coil) of the inductance element 36A. Note that a land 36Ab is also provided at the other end (end adjacent to the center of the coil).

As shown in FIG. 3, the inductance element (second inductance element) 36B is formed by a conductive pattern formed in a spiral coil shape on the other side in the longitudinal direction (a-axis direction) of the insulating sheet 32C. Further, as shown in FIG. 4, the inductance element 36B has an inductance L2. A land 36Ba to be connected to the second input and output terminal 34b of the RFIC chip 34 is provided at one end (end outside the coil) of the inductance element 36B. It is noted that a land 36Bb is also provided at the other end (end adjacent to the center of the coil).

As shown in FIG. 3, the inductance element (third inductance element) 36C is formed by a conductive pattern formed in a spiral coil shape on one side in the longitudinal direction (a-axis direction) of the insulating sheet 32B. Further, the inductance element 36C is opposite to the inductance element 36A in a stacking direction (c-axis direction). Furthermore, as shown in FIG. 4, the inductance element 36C has an inductance L3. A land 36Ca is provided at one end (end adjacent to the center of the coil) of the inductance element 36C. The land 36Ca is connected to the land 36Ab of the inductance element 36A on the insulating sheet 32C through an interlayer connection conductor 42 such as a through-hole conductor penetrating the insulating sheet 32B.

As further shown in FIG. 3, the inductance element (fourth inductance element) 36D is formed by a conductive pattern formed in a spiral coil shape on the other side in the longitudinal direction (a-axis direction) of the insulating sheet 32B. Further, the inductance element 36D is opposite to the inductance element 36B in the stacking direction (c-axis direction). Furthermore, as shown in FIG. 4, the inductance element 36D has an inductance L4. A land 36Da is provided at one end (end adjacent to the center of the coil) of the inductance element 36D. The land 36Da is connected to the land 36Bb of the inductance element 36B on the insulating sheet 32C through an interlayer connection conductor 44 such as a through-hole conductors penetrating the insulating sheet 32B.

It is noted that the inductance elements 36C, 36D on the insulating sheet 32B are monolithically combined with each other to become a single conductive pattern. Further, a through hole 32Ba is formed through the insulating sheet 32B and encloses the RFIC chip 34 mounted on the insulating sheet 32C.

As shown in FIG. 3, the external connection terminals 38, 40 are each formed by a conductive pattern provided on the insulating sheet 32A. Further, the external connection terminals 38, 40 are disposed on the opposite sides in the longitudinal direction (a-axis direction) of the insulating sheet 32A.

The external connection terminal 38 that is one of the external connection terminals is connected to the land 36Ca of the inductance element 36C on the insulating sheet 32B through an interlayer connection conductor 46 such as a through hole conductor penetrating the insulating sheet 32A.

Similarly, the external connection terminal 40 that is the other of the external connection terminals is connected to the land 36Da of the inductance element 36D on the insulating sheet 32B through an interlayer connection conductor 48 such as a through hole conductor penetrating the insulating sheet 32A.

The external connection terminal 38 that is one of the external connection terminals is connected to the land 22a of the first antenna pattern 22 of the antenna pattern 20 with, for example, solder. Similarly, the external connection terminal 40 that is the other of the external connection terminals is connected to the land 24a of the second antenna pattern 24 with, for example, solder.

It is noted that the RFIC chip 34 is formed by a semiconductor substrate. Further, the RFIC chip 34 is disposed between the inductance elements 36A, 36B and between the inductance elements 36C, 36D. The RFIC chip 34 functions as a shield to suppress magnetic field coupling and capacitive coupling between the inductance elements 36A, 36B having a spiral coil shape provided on the insulating sheet 32C. Similarly, magnetic field coupling and capacitive coupling between the inductance elements 36C, 36D having a spiral coil shape provided on the insulating sheet 32B are suppressed. This in turn suppresses narrowing of a passband of a communication signal.

As shown in FIG. 4, a matching circuit 35 that matches impedance of the RFIC chip 34 to impedance of the antenna pattern 20 based on the capacitance C1 (internal capacitance of the RFIC chip 34) and the inductances L1 to L4 (inductances of the four inductance elements). An inductance L5 indicates an inductance component of the second antenna pattern 24.

Further, FIG. 4 shows a state in which the capacitive coupling part 50 connected to the second antenna pattern 24 is capacitively coupled to the metal surface W1a of the article W1. For example, FIG. 4 shows a state in which the capacitive coupling part 50 is attached to the metal surface W1a via an insulative double-sided adhesive tape having a thickness t to generate the capacitance C2 between the capacitive coupling part 50 and the metal surface W1a. Further, in order to form a field emission antenna, a series resonant circuit is formed by a circuit comprised of the inductance L5 and the capacitance C3 of FIG. 4. Series resonance is resonance where impedance of a resonator becomes zero (in practice, 1Ω or less because a resistance component such as an inductance is left), and is resonance where characteristic impedance becomes almost 0Ω in a case of measuring impedance between the external connection terminals 38, 40 of the RFIC module 30 shown in FIG. 4 with the capacitance C1 (internal capacitance of the RFIC chip 34) left.

Further, the capacitance C3 is generated between the first antenna pattern 22 and the capacitive pattern 60 extending from the capacitive coupling part 50. A resonant frequency f0 of the antenna pattern 20 can be shifted toward a higher frequency by the capacitance C3. This allows communication to be made even when a length of the antenna pattern 20 is shorter than a quarter wavelength (λ/4) of a communication frequency.

Figure 5:
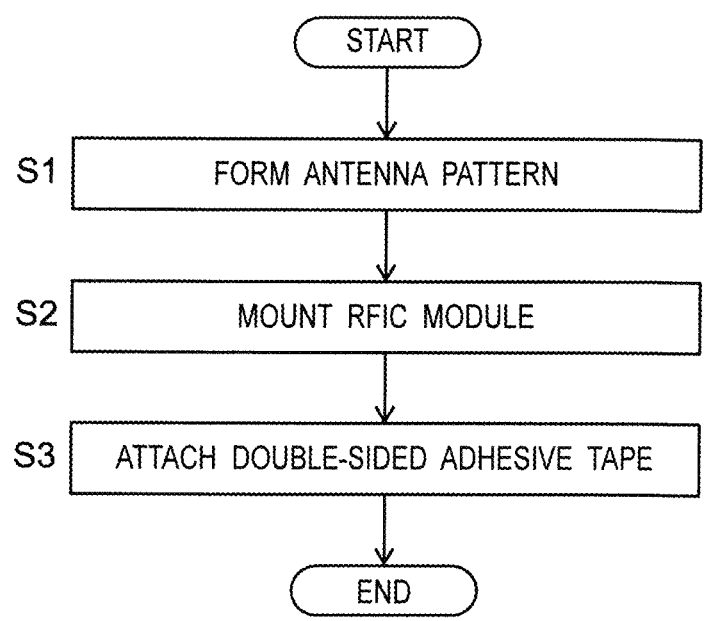
FIG. 5 is a flowchart showing a manufacturing procedure of the RFID tag.

Next, description will be given of a manufacturing method of the RFID tag 10 with reference to FIG. 5. FIG. 5 is a flowchart showing a manufacturing procedure of the RFID tag.

In step S1, the antenna pattern 20, the capacitive coupling part 50, and the capacitive pattern 60 are formed on the insulating sheet 12 by printing, for example. In step S2, the RFIC module 30 is mounted on the land 22a of the first antenna pattern 22 and the land 24a of the second antenna pattern 24. In step S3, one side of the double-sided adhesive tape is attached to the side of the insulating sheet 12 on which the antenna pattern 20 is formed. This causes the RFIC module 30 to be fixed to the double-sided adhesive tape. A user attaches the other surface of the double-sided adhesive tape to the metal surface W1a such that the antenna pattern 20 protrudes from the article W1 and the capacitive coupling part 50 faces the metal surface W1a of the article W1. This allows the RFID tag 10 to function as a field emission antenna, and further allows the metal surface W1a to function as a radiator.

From the above, the RFID tag 10 of the first embodiment is attached to the metal surface W1a of the article W1, and includes the RFIC chip 34, the antenna pattern 20 of a field emission type electrically connected to the RFIC chip 34, and the matching circuit 35 that matches the RFIC chip 34 to the antenna pattern 20. The RFID tag 10 further includes the capacitive coupling part 50 connected to the antenna pattern 20 and capacitively coupled to the metal surface W1a, and the insulating sheet 12 on which the antenna pattern 20 and the capacitive coupling part 50 are formed. The antenna pattern 20 includes the first antenna pattern 22 connected to the RFIC chip 34 with the matching circuit 35 interposed therebetween, and the second antenna pattern 24 having one end connected to the RFIC chip 34 with the matching circuit 35 interposed therebetween and the other end connected to the capacitive coupling part 50. The RFID tag 10 includes the capacitive pattern 60 having capacitance between the first antenna pattern 22 and the capacitive coupling part 50.

According to the exemplary embodiment, a series resonant pattern can be formed and allows an electric field to be radiated from the antenna pattern 20. Such a field emission antenna can transmit radio waves far, allowing the RFID tag 10 alone to have a communication distance of several cm to several tens of cm. Further, the antenna pattern 20, the capacitive coupling part 50, and the capacitive pattern 60 are connected in a loop. Therefore, the antenna pattern 20, the capacitive coupling part 50, and the capacitive pattern 60 can generate, as a loop antenna, a magnetic field passing through a center of the loop. A high frequency current excited by series resonance flows in the metal surface W1a capacitively coupled to the capacitive coupling part 50 to allow the metal surface W1a to radiate the electric field, making the metal surface W1a function as a radiation element and accordingly allowing the metal surface W1a to radiate the electric field. As described above, the electric field can be radiated from both the antenna pattern 20 and the metal surface W1a, making the communication distance of the RFID tag 10 longer. The RFIC chip 34 and the capacitive coupling part 50 are spaced apart from each other, and the matching circuit 35 and the capacitive coupling part 50 are spaced apart from each other. The capacitance C3 of the capacitive pattern 60 and the inductance L5 of the second antenna pattern 24 are connected in series.

Further, in the antenna pattern 20 having an inverted L shape, the RFIC module 30 is disposed with the lands 22a, 24a provided at ends distant from the metal surface W1a serving as feeding points. Putting distance between the inductances L1 to L4 and the capacitance C1 in the RFIC module 30 and the metal surface W1a makes matching performance stable. Further, disposing the RFIC module 30 apart from the metal surface W1a makes it possible to reduce variations in resonant frequency of the RFIC module 30 caused by a positional deviation when the RFID tag 10 is attached to the metal surface W1a. This is because an inductance value of the RFIC module 30 varies depending on the metal surface W1a due to the fact that the RFIC module 30 corresponds to the inductances L1 to L4 of an open magnetic circuit.

Further, the RFIC chip 34 and the matching circuit 35, and the capacitive coupling part 50 are disposed along the opposite edge sides of the insulating sheet 12. Since the RFIC chip 34 and the matching circuit 35 are disposed opposite to the capacitive coupling part 50, the RFIC chip 34 and the matching circuit 35 can be disposed apart from the capacitive coupling part 50 attached to the metal surface W1a. Therefore, an influence of the metal surface W1a on the capacitance C1 and the inductances L1 to L4 can be reduced.

Further, the capacitive pattern 60 and the capacitive coupling part 50 are disposed along the opposite edge sides of the insulating sheet 12. Since the capacitive pattern 60 is disposed opposite to the capacitive coupling part 50, the capacitance C3 between the capacitive pattern 60 and the first antenna pattern 22 can be kept away from the metal surface W1a to which the capacitive coupling part 50 is attached. Therefore, an influence of the metal surface W1a on the capacitance C3 can be reduced.

The second antenna pattern 24 includes the meander pattern 24c formed by a plurality of long segments parallel to one edge side of the insulating sheet 12 and a plurality of short segments parallel to the other edge side of the insulating sheet 12. The meander pattern 24c can make a pattern length of the second antenna pattern long enough. As a result, the RFID tag 10 can be miniaturized.

Second Embodiment

Figure 6:
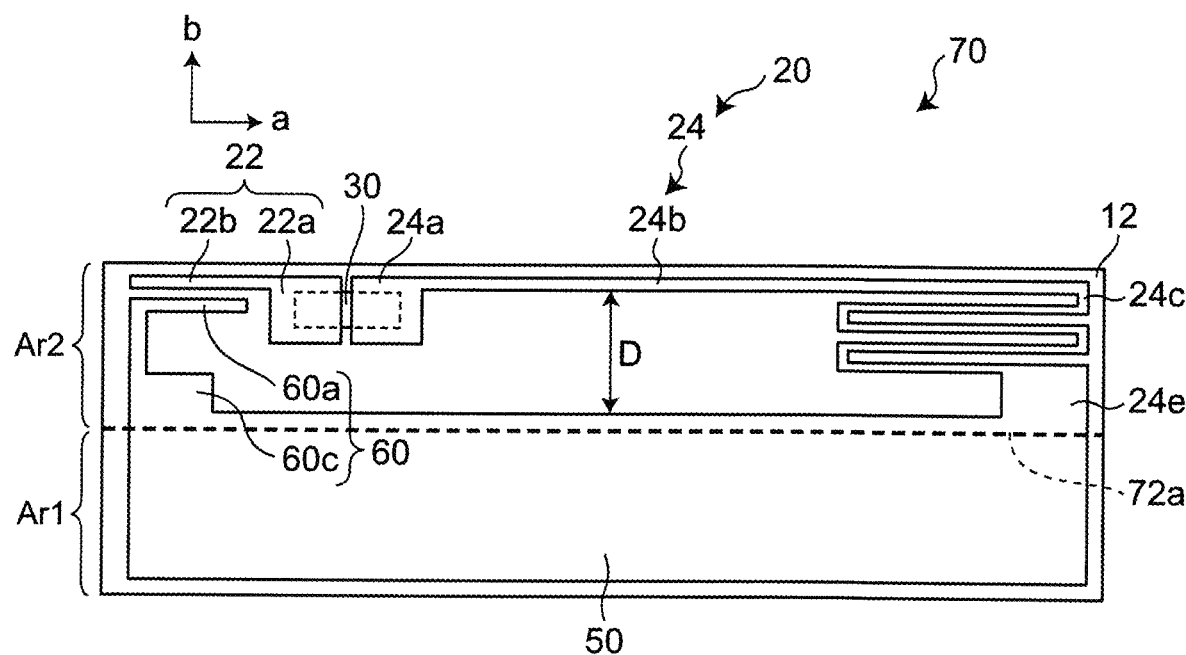
FIG. 6 is a schematic plan view of an RFID tag of a second embodiment.

Next, description will be given of an RFID tag 70 of a second exemplary embodiment of the present invention with reference to FIG. 6. FIG. 6 is a diagram showing a configuration of the RFID tag 70 of the second embodiment.

The RFID tag 70 of the second embodiment is an RFID tag based on the RFID tag 10 of the first exemplary embodiment in which a bend line 72a for bending is formed in the insulating sheet 12 and the capacitive coupling part 50. It is noted that the configuration of the RFID tag 70 of the second embodiment is the same as the configuration of the RFID tag 10 of the first embodiment except for the matters described below.

The bend line 72a is a perforation, a groove, a V-notch, or a press groove. The bend line 72a is formed in parallel with the edge sides of the insulating sheet 12. The user bends the insulating sheet 12 along the bend line 72 formed in advance to prevent an interval between the capacitive coupling part 50 facing the metal surface W1a and the RFIC module 30 and the distance D from varying depending on a manner of bending. As described above, formation of the bend line 72 can prevent the insulating sheet 12 from being obliquely bent and reduce performance variations due to the bending.

Further, in the RFID tag 70 of the second embodiment, a connection 24e of the second antenna pattern 24 of the first embodiment is wider than the other conductive pattern of the second antenna pattern 24. Further, a connection 60c of the capacitive pattern 60 is also wider than the other conductive pattern of the capacitive pattern 60. This can prevent, when the RFID tag 70 is bent, the conductive patterns of the connection 24e and the connection 60c from being broken and prevent the second antenna pattern 24 and the capacitive pattern 60 from being completely disconnected.

Figure 7:
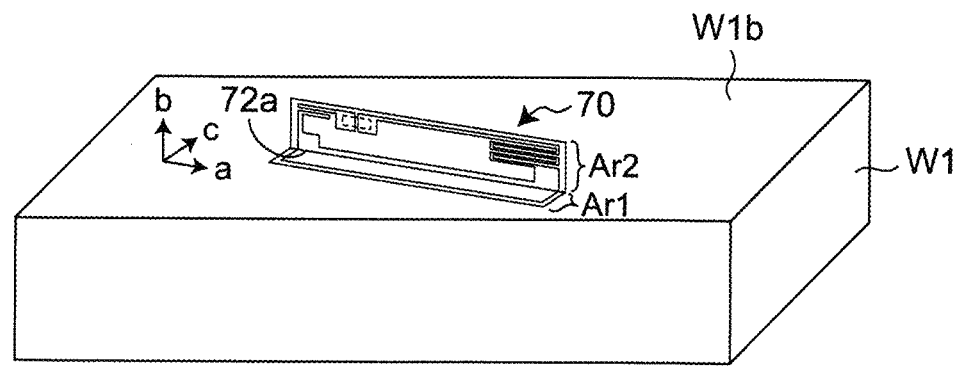
FIG. 7 is an explanatory view showing a state in which the RFID tag of the second embodiment is attached to the article.

FIG. 7 is an explanatory diagram showing a state in which the RFID tag 70 of the second embodiment is attached to the article W1. A first region Ar1 is attached to the article W1 to face a metal surface W1b. A second region Ar2 is bent so as to be perpendicular or inclined to the first region Ar1. Here, such an inclined relation in the embodiment corresponds to an inclined relation in a range from the vertical direction (b direction) to 45 degrees. This generates a magnetic field parallel to the metal surface W1b. Furthermore, an electric field is generated perpendicular to the metal surface W1b, this electric field loop induces a magnetic field, and then this chain causes an electromagnetic field distribution to spread. This allows the metal surface W1b to function as a radiation plate.

As described above, according to the second embodiment, since the bend line 72a is formed in the insulating sheet 12 and the capacitive coupling part 50, the insulating sheet 12 can be easily bent along the bend line 72a. Further, the higher the rigidity of the insulating sheet 12 is, the longer the bent state can be kept. Further, in the first embodiment, a positive direction and a negative direction of the X direction of FIG. 1 become null points of the antenna. When the RFID tag having such null points is attached to the metal surface W1a, a reading distance of the RFID tag becomes very short or the RFID tag becomes unreadable from the directions of the null points of the RFID tag. However, it has been confirmed by experiment that the above null points are almost eliminated by bending the second antenna pattern 24 such that the first region Ar1 and the second region Ar2 are perpendicular or inclined to each other as in the second embodiment. Attaching the RFID tag having no null point to the metal surface W1a allows the RFID to be read from not only right above the metal surface W1a but also any edge of the metal surface W1a, making it possible to provide a metal-compatible tag.

Third Embodiment

Figure 8:
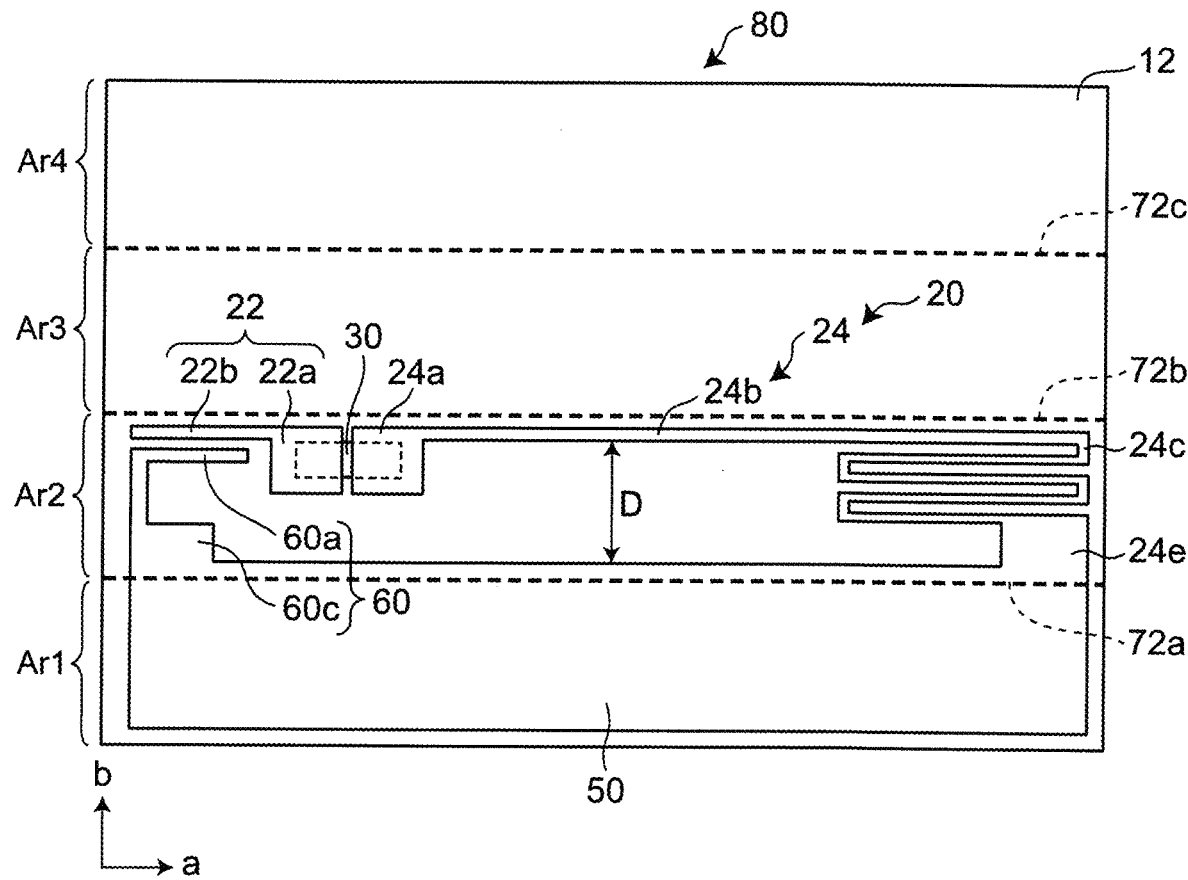
FIG. 8 is a schematic plan view of an RFID tag of a third embodiment.

Next, description will be given of an RFID tag 80 of a third exemplary embodiment of the present invention with reference to FIG. 8. FIG. 8 is a diagram showing a configuration of the RFID tag 80 of the third embodiment. The RFID tag 80 of the third embodiment includes another region extending from the second region of the insulating sheet 12 of the RFID tag 70 of the second embodiment. It is noted that the configuration of the RFID tag 80 of the third embodiment is the same as the configuration of the RFID tag 70 of the second embodiment except for the matters described below.

The RFID tag 80 of the third exemplary embodiment includes a third region Ar3 continuously extending from the second region Ar2 and a fourth region Ar4 continuously extending from the third region Ar3. A bend line 72b is formed in the insulating sheet 12 along a boundary between the second region Ar2 and the third region Ar3. The bend line 72b is parallel to the edge sides of the insulating sheet 12. A bend line 72c is formed in the insulating sheet 12 along a boundary between the third region Ar3 and the fourth region Ar4. The bend line 72c is parallel to the edge sides of the insulating sheet 12. The bend lines 72b, 72c are perforations, grooves, V-notches, or press grooves like the bend line 72a. The second region Ar2 and the third region Ar3 have the same area and the same outer shape. Therefore, when being bent along the bend line 72b, the second region Ar2 and the third region Ar3 can be attached to each other with their respective outer shapes conforming to each other. The first region Ar1 and the fourth region Ar4 have the same area and the same outer shape, but may have different areas and different outer shapes.

Figure 9:
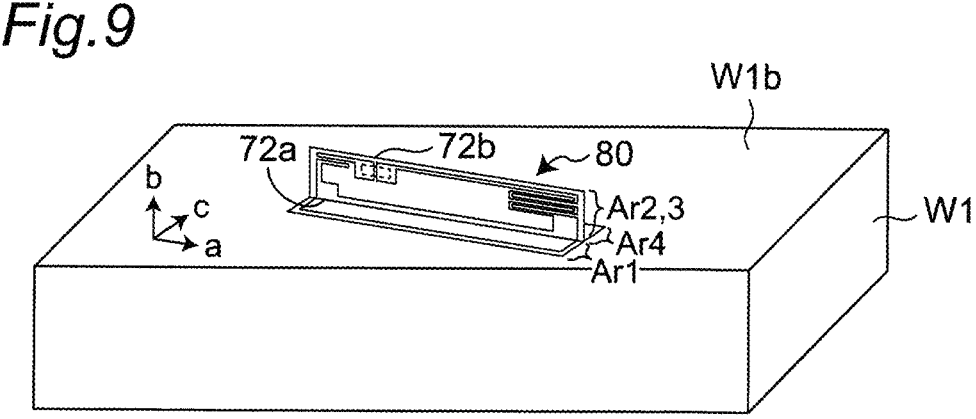
FIG. 9 is an explanatory diagram showing a state in which the RFID tag of the third embodiment is attached to the article.

FIG. 9 is an explanatory diagram showing a state in which the RFID tag 80 of the third embodiment is attached to the article W1. The first region Ar1 and the fourth region Ar4 are attached to the article W1 to face the metal surface W1b. The second region Ar2 and the third region Ar3 are bent so as to be perpendicular or inclined to the first region Ar1 and the fourth region Ar4. This allows the metal surface W1b to function as a radiation plate.

Figure 10:
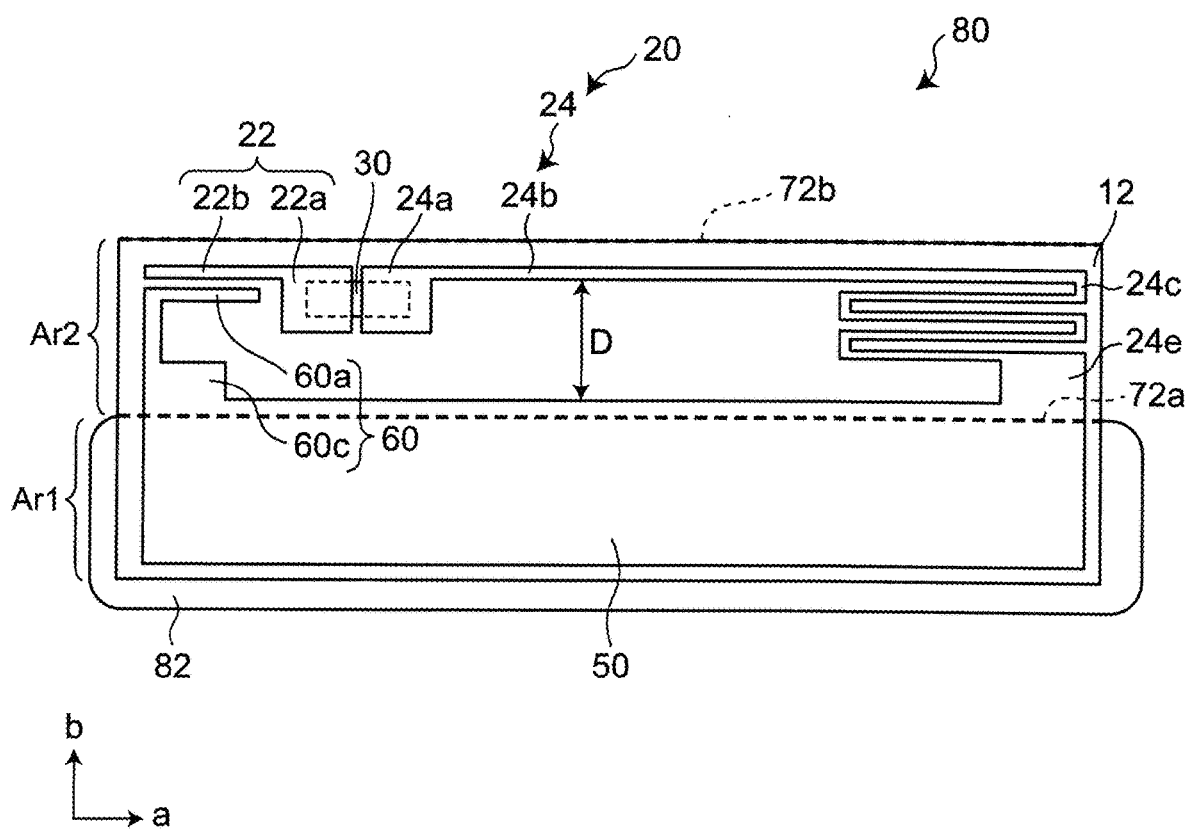
FIG. 10 is a schematic plan view showing an example of the RFID tag of the third embodiment at shipment.

FIG. 10 is a schematic plan view showing an example of the RFID tag of the third embodiment at shipment. Bending the RFID tag 80 along the bend line 72b causes the second region Ar2 and the third region Ar3 to be attached to each other and causes the first region Ar1 and the fourth region Ar4 to be attached to each other with a base paper 82 interposed therebetween. Subsequently, the user removes the base paper 82 from the insulating sheet 12, bends the first region Ar1 along the bend line 72a, and bends the fourth region Ar4 along the bend line 72c. In this state, the RFID tag 80 is attached to the metal surface W1b of the article W1.

Since the second region Ar2 and the third region Ar3 are already attached to each other at shipment, a burden on the user when the RFID tag 80 is attached to the article W1 can be reduced. It is noted that as a shipment form of the RFID tag 80, the RFID tag 80 in a state shown in FIG. 8 may be attached onto continuous roll paper.

Figure 11:
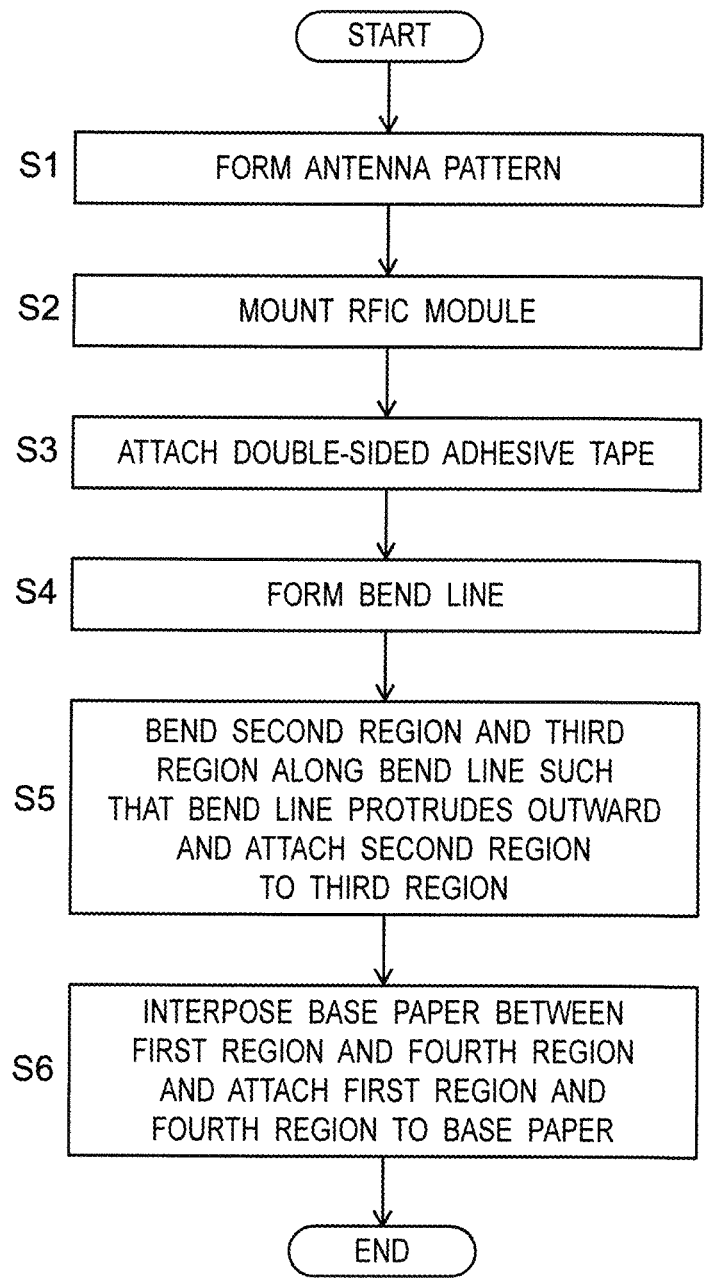
FIG. 11 is a flowchart of a manufacturing procedure of the RFID tag.

Next, description will be given of a manufacturing method of the RFID tag 80 of the third embodiment with reference to FIG. 11. FIG. 11 is a flowchart of a manufacturing procedure of the RFID tag 80. Steps S1 to S3 are the same as in the manufacturing method of the RFID tag 10 of the first embodiment; thus, description thereof will be omitted. In step S4, the bend lines 72a, 72b, and 72c are formed at predetermined positions of the RFID tag 80 having the double-sided adhesive tape attached onto the back surface. Next, in step S5, the second region Ar2 and the third region Ar3 are bent and attached to each other such that the bend line 72b between the second region Ar2 and the third region Ar3 protrudes outward.

Further, in step S6, the base paper 82 is interposed between the first region Ar1 and the fourth region Ar4, and the first region Ar1 and the fourth region Ar4 are each attached to the base paper 82. Through the above procedure, the RFID tag 80 is manufactured. Note that in order to ship the RFID tag 80 attached to roll paper in a state shown in FIG. 8, the bend lines 72a to 72c may be formed in step S4 and then attached to the roll paper.

Fourth Embodiment

Figure 12:
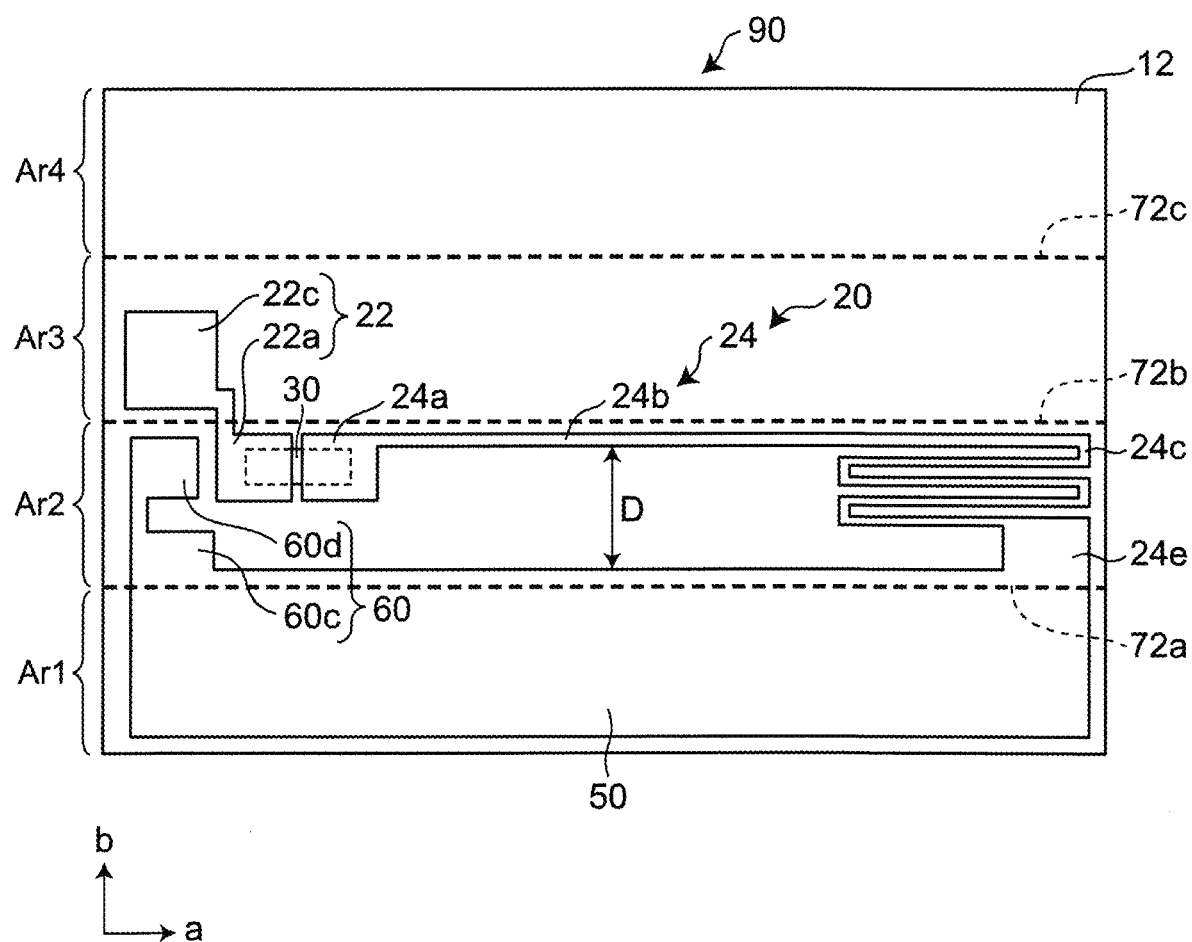
FIG. 12 is a schematic plan view of an RFID tag of a fourth embodiment.

Next, description will be given of an RFID tag 90 of the fourth exemplary embodiment of the present invention will be described with reference to FIG. 12. FIG. 12 is a diagram showing a configuration of the RFID tag 90 of the fourth embodiment. The RFID tag 90 of the fourth embodiment differs from the RFID tag 80 of the third embodiment in that the first antenna pattern 22 of the RFID tag 80 is formed extending into the third region Ar3. It is noted that a configuration of the RFID tag 90 of the fourth embodiment is the same as the configuration of the RFID tag 80 of the third embodiment except for the matters described below.

In the RFID tag 90 of the fourth embodiment, a conductive pattern extends from the land 22a of the first antenna pattern 22 formed in the second region Ar2 to the third region Ar3, and is bent along the bend line 72b, thereby forming an electrode 22c that generates the capacitance C3 with the capacitive pattern 60 in the third region Ar3. Further, the capacitive pattern 60 formed in the second region Ar2 also includes an electrode 60d that is formed opposite to the electrode 22c when the conductive pattern is bent along the bend line 72b. The capacitance C3 between the first antenna pattern 22 and the capacitive pattern 60 can be increased, so that the pattern length of the second antenna pattern 24 can be further shortened, and accordingly the RFID tag 90 can be further miniaturized.

It should be appreciated that the exemplary embodiments of the present invention is not limited to the above embodiments and can be modified as follows.

(1) In the first embodiment, the RFID tag 10 is attached to the metal surface W1a without bending the insulating sheet 12, but the present invention is not limited to this configuration. As in the second embodiment, the capacitive coupling part 50 may be bent along the longitudinal direction of the capacitive coupling part 50 and attached to the metal surface W1a.

(2) In each of the above exemplary embodiments, the second antenna pattern 24 includes the meander pattern 24c, but it is noted the present invention is not limited to this configuration. For example, in place of the meander pattern 24c, the strip 24b and the connection 24d may further extend along a corresponding edge side of the insulating sheet 12 by a corresponding length.

Figure 13:
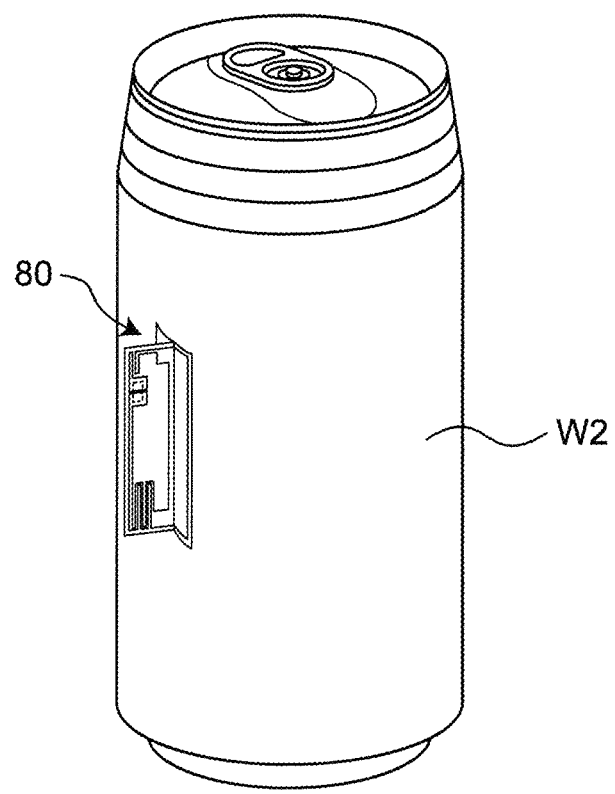
FIG. 13 is an explanatory diagram showing a state in which the RFID tag is attached to an article.

(3) In each of the above exemplary embodiments, the RFID tag is attached to the planar metal surface of the article, but it is noted that the present invention is not limited to this configuration. For example, as shown in FIG. 13, the RFID tag may be attached to a curved metal surface of an article W2. In this configuration, the RFID tag can be attached with the first region Ar1 and the fourth region Ar4 deformed conforming to the curved surface. Further, the second region Ar2 and the third region Ar3 are not deformed, so that the shape of the antenna pattern 20 formed in advance can be maintained. As a result, the antenna characteristics do not change.

Figure 14:
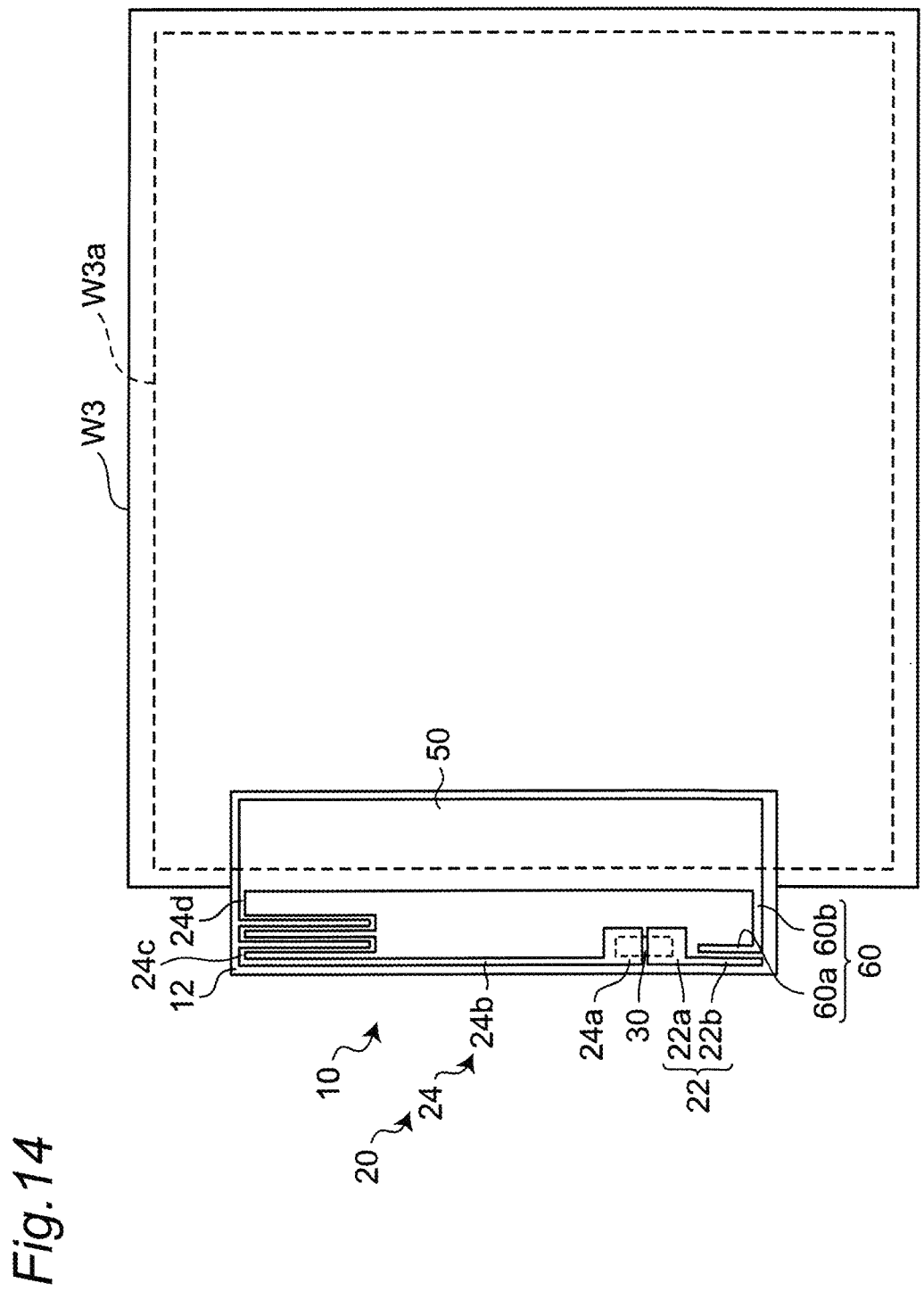
FIG. 14 is an explanatory diagram showing a state in which the RFID tag is attached to an article.
Figure 16A:
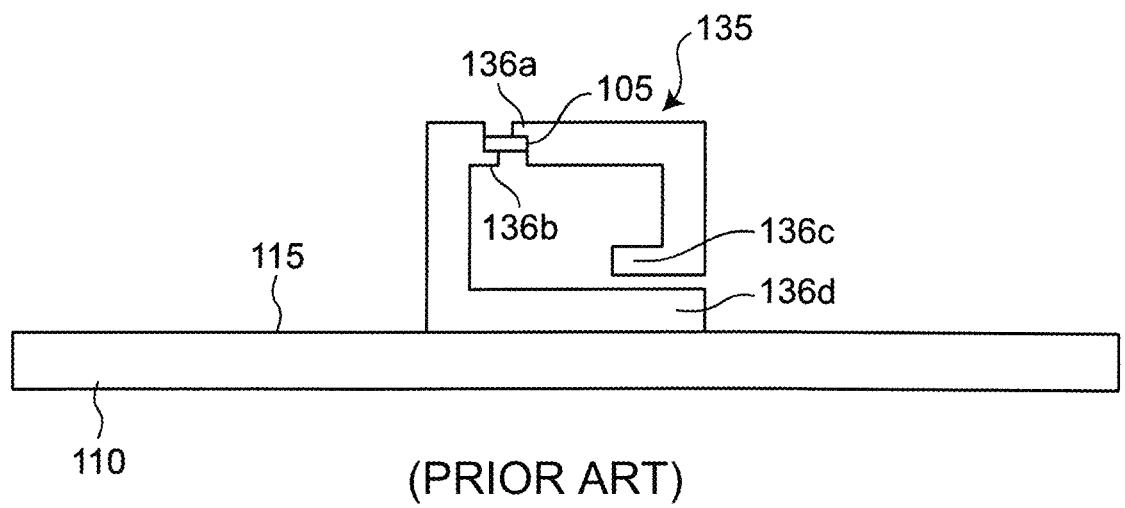
FIG. 16A is a schematic plan view showing an RFID tag of a conventional example attached to a metal surface.
Figure 16B:
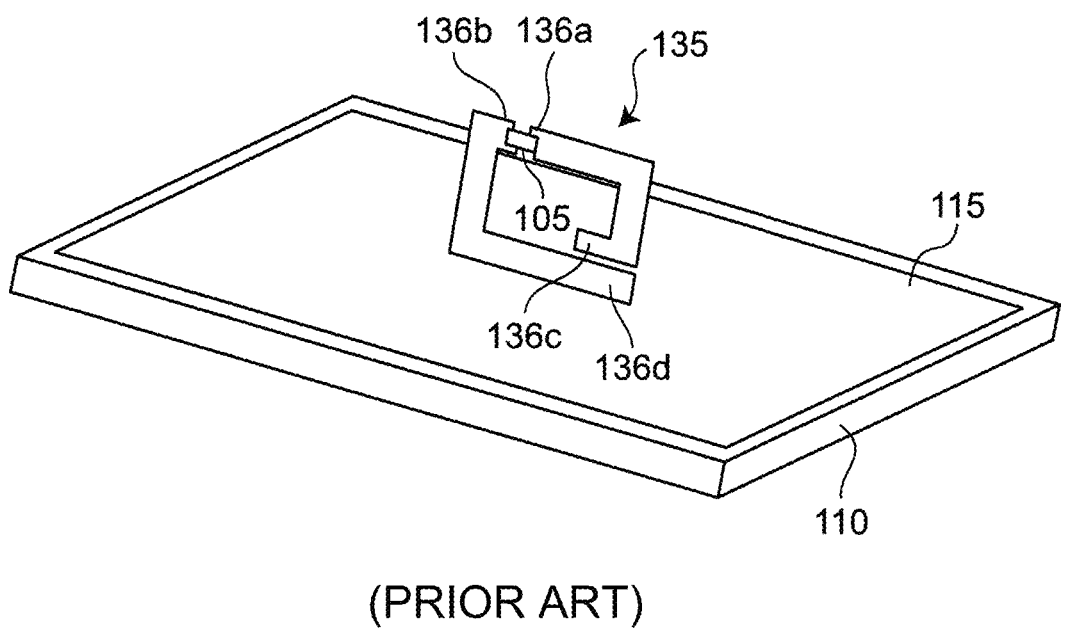
FIG. 16B is a perspective view showing the RFID tag of the conventional example attached to the metal surface.
Figure 17:
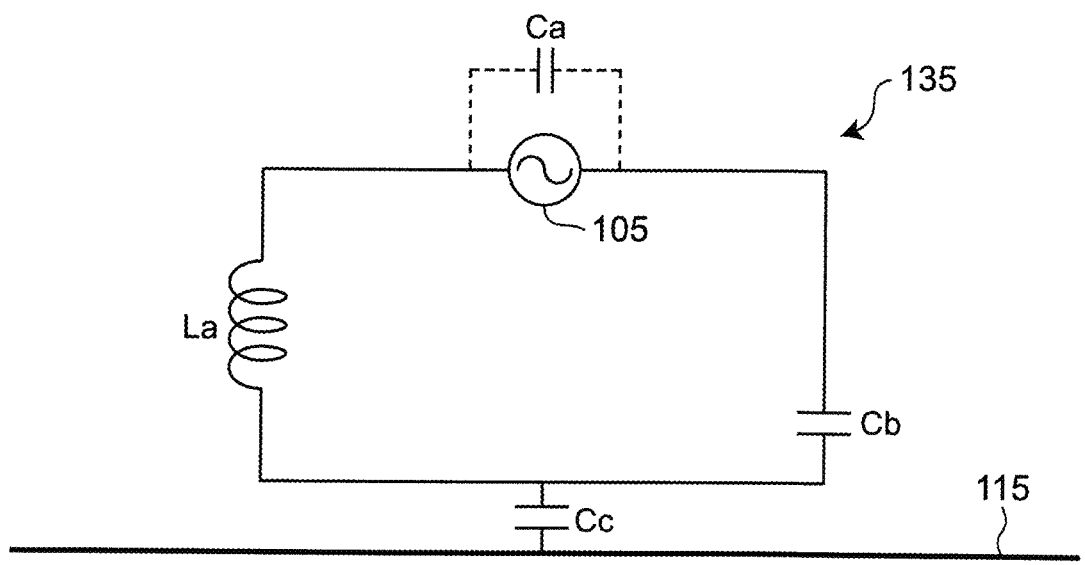
FIG. 17 is an equivalent circuit diagram of the RFID tag of the conventional example attached to the metal surface.

Further, as shown in FIG. 14, the article to which the RFID tag 10 is attached may be, for example, a printed board W3. In this configuration, the capacitive coupling part 50 of the RFID tag 10 is capacitively coupled to a ground conductor W3a of the printed board W3. Therefore, the capacitive coupling part 50 is attached to printed board W3 to face the ground conductor W3a. The printed board W3 may be a printed wiring board (PWB) or a printed circuit board (PCB).

(4) In each of the above exemplary embodiments, the capacitive pattern 60 is formed by the conductive pattern extending from the capacitive coupling part 50 toward the first antenna pattern 22, but it is noted that the present invention is not limited to this configuration. As shown in FIG. 15, a land 22d of the first antenna pattern 22 connected to the RFIC module 30 may extend toward the capacitive coupling part 50 so as to form a capacitive part of the capacitance C3 between the land 22d and the capacitive coupling part 50.

(5) In each of the above exemplary embodiments, the antenna pattern 20 is a conductive pattern having an inverted L shape, but it is noted the present invention is not limited to this configuration. The antenna pattern 20 can function as a field emission antenna even when the antenna pattern 20 is a conductive pattern having an inverted F shape.

REFERENCE SIGNS LIST

10 RFID tag
12 insulating sheet
20 antenna pattern
22 first antenna pattern
22a, 22d land
22b strip
22c electrode
24 second antenna pattern
24a land
24b strip
24c meander pattern
24d, 24e connection
26 capacitive pattern
30 RFIC module
32A, 32B, 32C insulating sheet
34 RFIC chip
35 matching circuit
36A, 36B, 36C, 36D inductance element
38 external connection terminal
40 external connection terminal
50 capacitive coupling part
60 capacitive pattern
60a capacitive part
60b connection
60d electrode
70 RFID tag
72a, 72b, 72c bend line
80 RFID tag
82 base paper
90 RFID tag
105 radio IC chip
110 base
115 radiation plate
135 coupling electrode
136a coupling part
136b coupling part
136c opposing end
136d opposing end
Ar1 first region
Ar2 second region
Ar3 third region
Ar4 fourth region
L1, L2, L3, L4, L5 inductance
La inductance component
C1, C2, C3, C4 capacitance Ca, Cb, Cc capacitance
W1, W2, W3 article
W1a, W1b metal surface
W3a ground conductor

The invention claimed is:

1. An RFID tag attachable to a metal surface of an article, the RFID tag comprising:
a radio IC chip;
an insulating substrate;
an antenna pattern disposed on the insulating substrate and electrically connected to the radio IC chip;
a matching circuit configured to match the radio IC chip to the antenna pattern; and
a capacitive coupling member disposed on the insulating substrate and connected to the antenna pattern and configured to capacitively couple to the metal surface of the article,
wherein the antenna pattern includes a first antenna pattern connected to the radio IC chip with the matching circuit interposed therebetween, and a second antenna pattern having a first end connected to the radio IC chip with the matching circuit interposed therebetween and a second end connected to the capacitive coupling member,
wherein a capacitive pattern is disposed between the first antenna pattern and the capacitive coupling member, and
wherein the antenna pattern, the capacitive coupling member, and the capacitive pattern are connected in a loop.

2. The RFID tag according to claim 1, wherein the capacitive coupling member is disposed along a first side edge of the insulating substrate, and the radio IC chip and the matching circuit are disposed along a second side edge of the insulating substrate that is opposite to the capacitive coupling member.

3. The RFID tag according to claim 2, wherein the capacitive pattern is disposed along the second side edge of the insulating substrate opposite to the capacitive coupling member.

4. The RFID tag according to claim 1, wherein the second antenna pattern includes a meander pattern formed by a plurality of long segments extending in a direction parallel to a first side edge of the insulating substrate and a plurality of short segments extending in a direction parallel to a second side edge of the insulating substrate and perpendicular to the first side edge.

5. The RFID tag according to claim 1, wherein a connection portion of the second antenna pattern to the capacitive coupling member is greater in pattern width than other portions of the second antenna pattern.

6. The RFID tag according to claim 1,
wherein insulating substrate comprises a bend line on which the capacitive coupling member is disposed, and
wherein the insulating substrate includes, with the bend line configured as a boundary, a first region in which a half or more in area of the capacitive coupling member is disposed, and a second region in which the radio IC chip is disposed.

7. The RFID tag according to claim 6, wherein the insulating substrate includes:
a third region that includes an area identical to the second region and continuously extends from the second region, and
a fourth region that continuously extends from the third region,
wherein respective bend lines are individually disposed along a boundary between the second region and the third region and a boundary between the third region and the fourth region in the insulating substrate.

8. The RFID tag according to claim 7, further comprising:
a double-sided adhesive tape attached to a side of the insulating substrate on which the antenna pattern and the radio IC chip mounted on the antenna pattern are disposed,
wherein the insulating substrate is bent along the bend line serving as the boundary between the second region and the third region, such that the second region is attached to the third region, and
wherein the first region and the fourth region are attached to a base paper interposed between the first region and the fourth region.

9. The RFID tag according to claim 7, wherein the insulating substrate is bent along the bend line between the third region and the fourth region, such that the third region is configured perpendicularly or in an inclined position relative to the fourth region.

10. The RFID tag according to claim 6, wherein the insulating substrate is bent along the bend line configured as the boundary between the first region and the second region, such that the second region is configured perpendicularly or in an inclined position relative to the first region.

11. An RFID tag comprising:
an insulating substrate;
a radio IC chip;
an antenna pattern disposed on the insulating substrate and electrically connected to the radio IC chip;
a matching circuit configured to match the radio IC chip to the antenna pattern; and
a capacitive coupling member disposed on the insulating substrate and connected to the antenna pattern,
wherein the antenna pattern includes a first antenna pattern connected to the radio IC chip with the matching circuit interposed therebetween, and a second antenna pattern having a first end connected to the radio IC chip with the matching circuit interposed therebetween and a second end connected to the capacitive coupling member, and
wherein a capacitive pattern is disposed between the first antenna pattern and the capacitive coupling member, and
wherein the antenna pattern, the capacitive coupling member, and the capacitive pattern are connected in a loop.

12. The RFID tag according to claim 11, wherein the capacitive coupling member is disposed along a first side edge of the insulating substrate, and the radio IC chip and the matching circuit are disposed along a second side edge of the insulating substrate that is opposite to the capacitive coupling member.

13. The RFID tag according to claim 12, wherein the capacitive pattern is disposed along the second side edge of the insulating substrate opposite to the capacitive coupling member.

14. The RFID tag according to claim 11, wherein the second antenna pattern includes a meander pattern formed by a plurality of long segments extending in a direction parallel to a first side edge of the insulating substrate and a plurality of short segments extending in a direction parallel to a second side edge of the insulating substrate and perpendicular to the first side edge.

15. The RFID tag according to claim 11,
wherein the insulating substrate comprises a bend line on which the capacitive coupling member is disposed, and
wherein the insulating substrate includes, with the bend line configured as a boundary, a first region in which at least half in area of the capacitive coupling member is disposed, and a second region in which the radio IC chip is disposed.

16. The RFID tag according to claim 15, wherein the insulating substrate includes:
a third region that includes an area identical to the second region and continuously extends from the second region, and
a fourth region that continuously extends from the third region,
wherein respective bend lines are individually disposed along a boundary between the second region and the third region and a boundary between the third region and the fourth region in the insulating substrate.

17. The RFID tag according to claim 16, further comprising:
a double-sided adhesive tape attached to a side of the insulating substrate on which the antenna pattern and the radio IC chip mounted on the antenna pattern are disposed,
wherein the insulating substrate is bent along the bend line serving as the boundary between the second region and the third region, such that the second region is attached to the third region, and
wherein the first region and the fourth region are attached to a base paper interposed between the first region and the fourth region.

18. The RFID tag according to claim 17, wherein the insulating substrate is bent along the bend line configured as the boundary between the first region and the second region, such that the second region is configured perpendicularly or in an inclined position relative to the first region.

19. The RFID tag according to claim 16, wherein the insulating substrate is bent along the bend line between the third region and the fourth region, such that the third region is configured perpendicularly or in an inclined position relative to the fourth region.

20. An article comprising:
a metal surface; and
an RFID tag attached to the metal surface, and including:
a radio IC chip,
an insulating substrate,
an antenna pattern disposed on the insulating substrate and electrically connected to the radio IC chip,
a matching circuit configured to match the radio IC chip to the antenna pattern,
a capacitive coupling member disposed on the insulating substrate and connected to the antenna pattern and capacitively coupled to the metal surface,
wherein the antenna pattern includes a first antenna pattern connected to the radio IC chip with the matching circuit interposed therebetween, and a second antenna pattern having a first end connected to the radio IC chip with the matching circuit interposed therebetween and a second end connected to the capacitive coupling member,
wherein the RFID tag includes a capacitive pattern having capacitance between the first antenna pattern and the capacitive coupling member, and
wherein the antenna pattern, the capacitive coupling member, and the capacitive pattern are connected in a loop.

* * * * *